J. H. WAGENHORST.
VEHICLE WHEEL RIM.
APPLICATION FILED OCT. 29, 1910.
1,103,637.
Patented July 14, 1914.
3 SHEETS—SHEET 1.
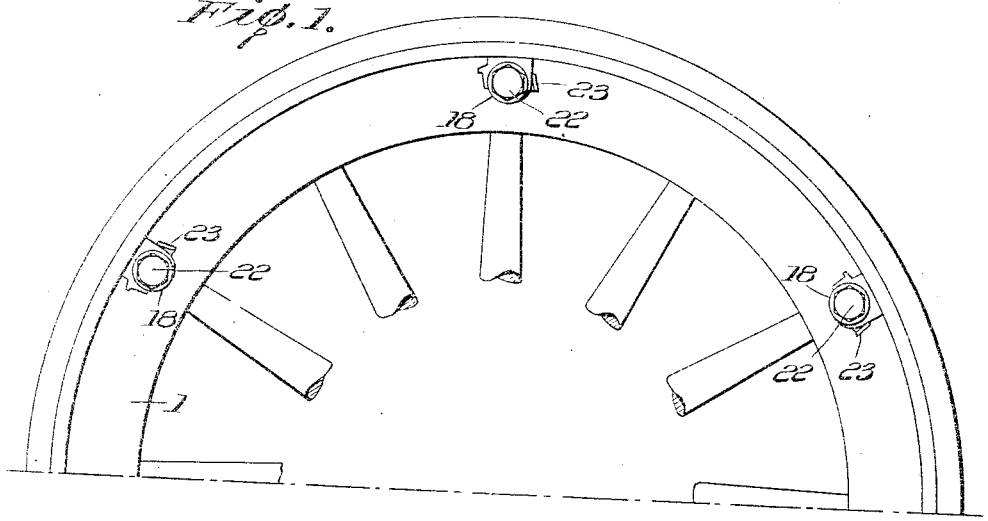
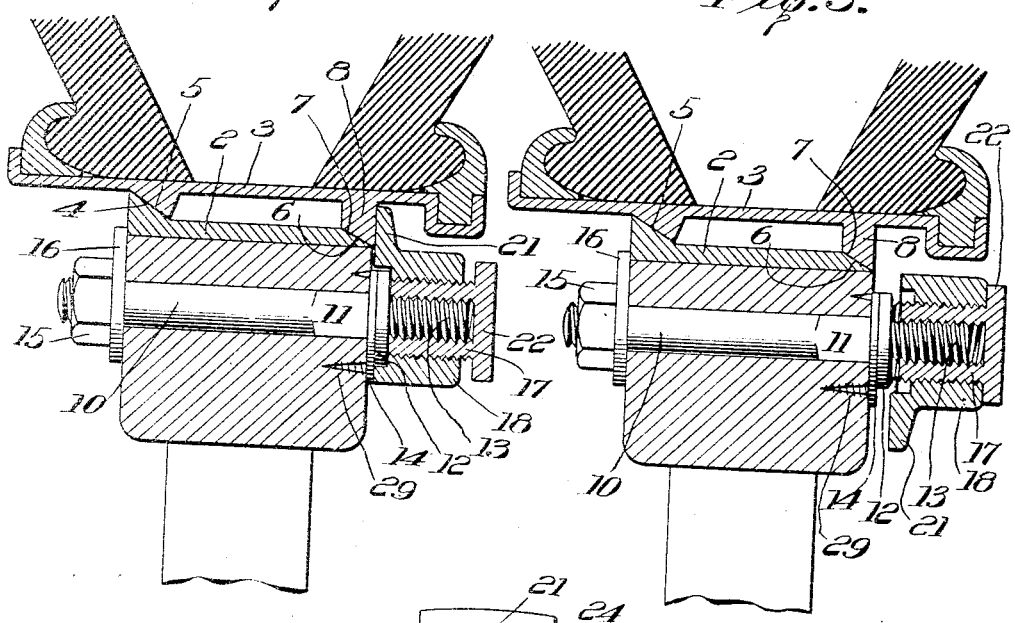
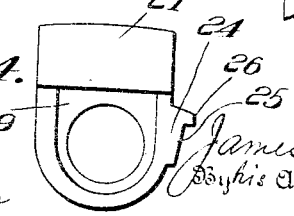

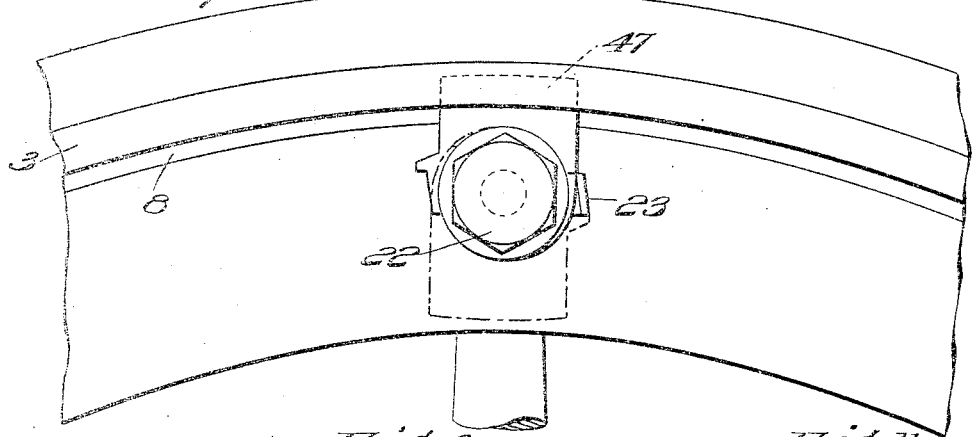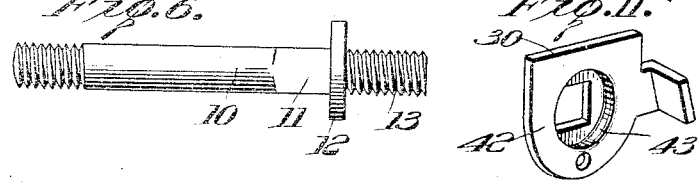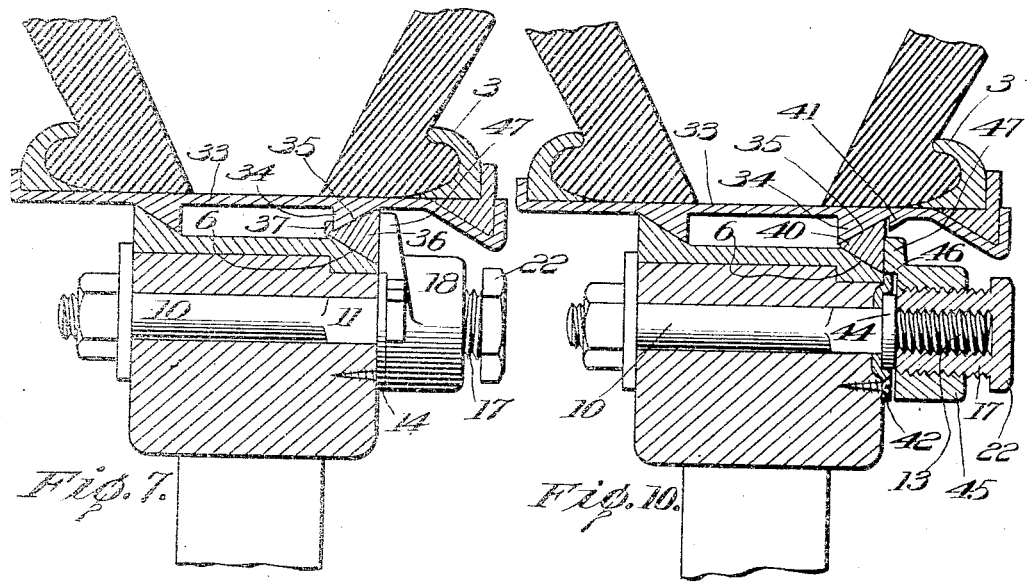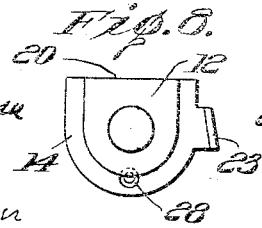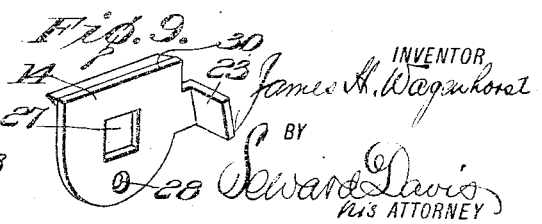

J. H. WAGENHORST.
VEHICLE WHEEL RIM.
APPLICATION FILED OCT. 29, 1910.

1,103,637.

Patented July 14, 1914.
3 SHEETS—SHEET 3.

Witnesses:
Edmund Quincy Moore
Gerald E. Trwilliger

James H. Wagenhorst
Inventor
By his Attorney Seward Davis

UNITED STATES PATENT OFFICE.

JAMES H. WAGENHORST, OF AKRON, OHIO, ASSIGNOR, BY MESNE ASSIGNMENTS, OF TWO-FIFTHS TO THE B. F. GOODRICH COMPANY, OF NEW YORK, N. Y., A CORPORATION OF NEW YORK, ONE-FIFTH TO THE GOODYEAR TIRE & RUBBER COMPANY, OF AKRON, OHIO, A CORPORATION OF OHIO, AND ONE-FIFTH TO THE UNITED STATES TIRE COMPANY, OF NEW YORK, N. Y., A CORPORATION OF NEW YORK.

VEHICLE WHEEL-RIM.

1,103,637.   Specification of Letters Patent.   Patented July 14, 1914.

Application filed October 29, 1910. Serial No. 589,680.

*To all whom it may concern:*

Be it known that I, JAMES H. WAGENHORST, a citizen of the United States, residing in the city of Akron, county of Summit, and State of Ohio, have invented certain new and useful Improvements in Vehicle Wheel-Rims, of which the following is a specification.

This invention relates to improvements in vehicle wheel rims, and especially to improved means for securing a rim adapted to carry a pneumatic or other resilient tire upon a wheel in such manner that it may be easily removed and replaced by another rim. Rims of this type are commonly called demountable rims, and their purpose is to permit new tire to be applied to the wheels of the vehicle without the necessity for detaching the pneumatic tire from or applying it to the tire-carrying rim.

Figure 12:
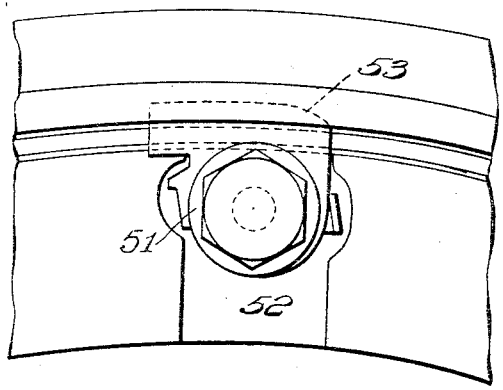
Figure 13:
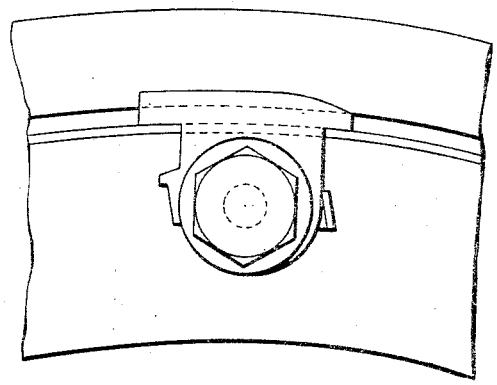
Figure 14:
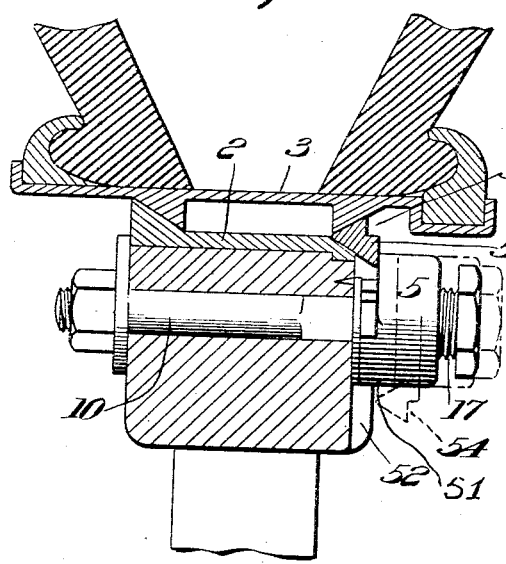
Figure 15:
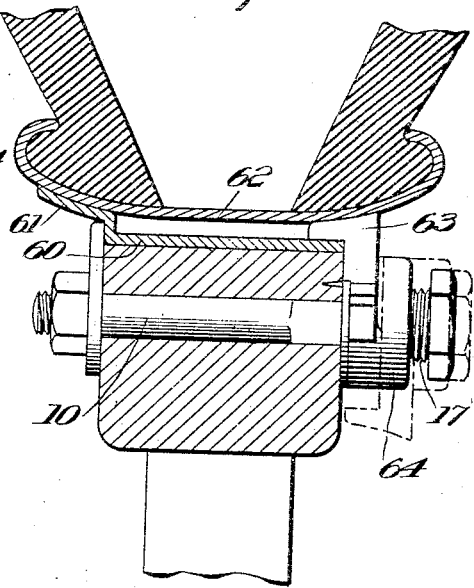
Figure 16:
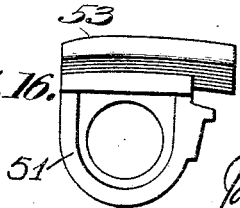

In the accompanying drawings which form a part of this specification, Figure 1 is a side view of a portion of a vehicle wheel fitted with a rim structure embodying one form of my invention; Fig. 2 is a transverse section through a wheel felly, rim and locking means embodying my invention, the tire-carrying rim being shown locked upon the felly; Fig. 3 is a view similar to Fig. 2, the locking means being shown moved to an inoperative position; Fig. 4 is an elevational view of the inside, or side next to the felly, of the locking nut or latch; Fig. 5 is a side elevation upon the same scale as Fig. 2 of the parts shown in that figure, the locking nut or latch being shown in upright or locking position in full lines, and in inoperative position in dotted lines; Fig. 6 is an elevation of one of the felly bolts; Fig. 7 is a view similar to Fig. 2 of a modified construction; Fig. 8 is an end view of the bolt shown in Fig. 6, showing the same inserted through the hole in the felly plate; Fig. 9 is a perspective view of the felly plate detached from the bolt; Fig. 10 is a view similar to Fig. 2 of a modified construction; Fig. 11 is a perspective view of the felly plate shown in Fig. 10; Fig. 12 is a side elevation of a portion of a felly and rim showing a modified form of locking means embodying my invention; Fig. 13 is a view similar to Fig. 12 of another modification; Figs. 14 and 15 are transverse sectional views illustrating the modifications shown in Figs. 12 and 13, respectively; Fig. 16 is an elevational view of the inside of the locking member shown in Figs. 12 and 14.

Referring to the drawings in detail, and particularly to Figs. 1 to 6, inclusive, and Figs. 8 and 9, the numeral 1 designates a wheel felly upon which is permanently secured in any suitable manner a felly band 2. The latter is provided with suitable faces to be engaged by portions of the tire-carrying rim 3. For example, as shown in Figs. 2 and 3, the felly band may have at one edge a raised flange provided with an inclined face 4 engaging a similarly inclined face 5 on the tire-carrying rim, and at the other edge a downwardly inclined or beveled face 6 engaging a similarly inclined face 7 formed on a flange 8 projecting inwardly or downwardly from the tire-carrying rim.

For forcing the faces 5 and 7 into engagement with the corresponding faces 4 and 6 and for retaining the tire-carrying rim upon the felly, I utilize the following construction: A number of bolts 10 are passed through transverse holes in the felly, these bolts having squared portions 11 adapted to fit similarly shaped portions of the holes through which they pass, shouldered portions or collars 12 adjacent the squared portions and projecting screw-threaded ends 13. The collars 12 take the place of bolt heads and are drawn against the face of the felly or against the felly plates 14 by means of nuts 15 bearing against washers 16. The screw-threaded portion 13 of each bolt is engaged by an externally and internally threaded sleeve or nut 17, upon the external thread of which screws the locking nut or latch 18. The latter is provided in its inner face with a socket 19 adapted to receive the collar 12 on the bolt 10. The collar 12 and socket 19 are preferably made of some non-circular configuration, for example, that shown in Figs. 4 and 8, in which the collar 12 has a flat upper surface 20 engaged by the flat upper wall of the socket 19. The latch or locking nut is provided with a projecting ear or eccentric portion 21 which engages with the flange 8 projecting inwardly or downwardly from the tire-carrying rim, when the latch is turned so that this projection or ear extends upwardly, or with reference to the wheel, radially outward, the latch being out of engagement with this flange, leaving the tire-carrying rim free to be removed laterally, when the latch is rotated through a portion of a revolution. The internal and external threads of the sleeve 17 are of opposite pitches, it usually being found most desirable to have the internal thread right-handed and the external thread left-handed as with this arrangement the latch will be screwed in when the nut or sleeve is turned in a right-hand direction, and drawn out when the nut is turned in the opposite direction. The use of the two threads gives a very rapid travel to the latch or locking nut. It will be seen that when the latch is screwed in so that the bolt collar 12 is within the socket 19, the latch will be positively locked against rotation on account of the engagement between the flat wall of the socket 19 and the flat side 20 of the collar, the bolt 10 being held against rotation by its squared portion 11.

When the tire-carrying rim 3 is to be detached from the felly, the nut or sleeve 17 is rotated to unscrew and draw out the latch 18, this movement causing the socket 19 to be withdrawn from its engagement with the collar 12 when the latch will be free to rotate. As soon as this occurs the latch will ordinarily be rotated by the further turning of the sleeve 17, through friction, but if this should not at once take place, the further rotation of the sleeve will simply cause the latch to be screwed back until it engages the head 22 of the sleeve, when its rotation with the sleeve will be compelled. The turning of the latch or eccentric locking nut through a part of a revolution has the effect of moving the projection 21 out of engagement with and out of the line of the flange 8, thus permitting the lateral movement of the flange and the removal of the rim. The single operation of rotating the sleeve 17 thus acts both to draw the latch out of engagement with the flange on the tire-carrying rim and at the proper time to rotate the projection on the latch out of the path of the rim so as to permit the removal of the latter.

In order to limit the rotary movement of the latch and to hold it in inoperative position, I provide means to engage the latch when revolved through a portion of a revolution, preferably a half revolution. These means preferably take the form of an inclined lug 23, bent outwardly from the felly plate 14, and engaged by a lug 24 on the side of the latch, the latter preferably having an inclined outer face 25 adapted to wedge within the inclined inner face of the lug 23 and having a stop 26 adapted to positively limit the rotary movement of the latch. With this arrangement it will be seen that when the latch is rotated through a half revolution by the turning of the sleeve 17, the inclined face 25 on the lug 24 will wedge within the lug 23 and the latch will be retained in its inverted or inoperative position. This wedging engagement will not be sufficiently tight, however, to prevent the latch from being returned to its upright or operative position when the sleeve 17 is turned in a direction to screw the latch in. Immediately, therefore, upon the rotation of the sleeve in such direction, the latch will be returned to its operative position, it being prevented from rotating beyond such position by the engagement of its side with the lug 23, as shown in Fig. 5. Further rotation of the sleeve 17 will therefore cause it to travel inwardly, it being guided first by the lug 23 and then by the engagement between the walls of the socket 19 and the collar 12.

When the latch is being screwed in it acts to force the tire-carrying rim upon the felly just as an ordinary nut would act, thus permitting the parts to be brought into proper wedging engagement and allowing for some degree of adjustment for irregularities of dimension. It is preferably so adjusted initially, however, that it may be screwed up until the end of the sleeve 17 engages with the collar 12. When this occurs, the sleeve 17 jams and operates as a lock nut preventing the accidental unscrewing of the parts. This initial adjustment is very easily performed by unscrewing the nut 15 and drawing the bolt 10 part way out of its hole through the felly, until the sleeve 17 and latch 18 are moved away from the felly sufficiently to permit the latch to clear the lug 23. The latch may then be rotated through one or more revolutions about the sleeve in the desired direction while the latter is held stationary, thus changing the initial position of the latch upon the sleeve. The head 22 of the sleeve or nut 17 which is of larger diameter than that of the threaded portion of the sleeve will be engaged by the latch when the sleeve is rotated in a direction to unscrew from the threaded bolt portion 13, before the latch clears the lug 23, and before the sleeve 17 is entirely unscrewed from the threaded portion 13, in the normal operation of the device, so that the adjustment of the initial position of the latch cannot be accomplished without first withdrawing the bolt 10 as stated. This construction, however, has the important advantage of preventing the latch and sleeve from becoming separated from the felly in the operation of the rim and thus eliminates the danger of losing or mislaying parts.

The engagement between the latch and the head 22 also insures the rotation of the latch to inoperative position after it has been drawn back from engagement with the rim, as has been above described.

In order to prevent rusting of the parts together while in use it is preferable to make engaging parts of different metals. For example, if the bolt 10 and latch 18 be made of steel, the sleeve 17 should be made of bronze or the like. A rustless engagement is thus secured both between the bolt and sleeve, and sleeve and latch, with the use of but a single bronze part.

The felly plate 14 in addition to carrying the lug 23, protects the face of the felly and may also be used to assist in preventing the rotation of the bolt 10. For the latter purpose it is provided with square hole 27, which fits the squared portion 11 of the bolt, the lower portion of the plate being perforated as at 28 for the reception of a screw 29 which prevents the rotation of the plate upon the felly. The upper flat surface 30 of the felly plate will also be engaged by the lower surface of the projection 21, and will assist the collar 12 in preventing the rotation of the latch when the latter is in operative position.

In Fig. 7 a modification of my invention is shown, the tire-carrying rim 33, instead of being provided with a flange 8, having merely a downwardly or inwardly projecting rib 34 having an inclined bearing face 35. A transversely split annular locking ring 36 is inserted between the face 35 on the rim and the beveled face 6 on the felly band. In order that the locking ring 36 may retain its position when the tire-carrying rim is removed from the felly ring, it is provided with an annular flange 37 which engages the inner face of the rib 34, the resiliency of the locking ring serving to hold it in engagement with the bearing face 35 of the rib 34. The flange 37 in no way interferes with the forcing of the locking ring into wedging engagement with the faces 6 and 35. In this modification of my invention the latch 18, which is of the construction shown in Figs. 2, 3 and 4, engages the outer face of the locking ring 36, instead of the flange 8, in other respects its operation being the same as already described.

Fig. 10 shows a modification of the form of my invention shown in Fig. 7. In this figure a locking ring 40 of triangular cross-section and without a flange 37 is provided, this ring engaging the inclined surface 35 of the rib 34 and the beveled surface 6 of the felly band. In order to retain this ring in position in engagement with the surface 35, the tire-carrying rim is provided with a downwardly or inwardly projecting flange 41 which engages the outer face of the locking ring, a groove being thus formed inside the tire-carrying rim into which the ring 40 is sprung. As will be obvious, in place of using a continuous flange 41, a series of projections may be provided which will operate in the same manner. In this figure I have also shown a modified form of felly plate 42, this plate being illustrated in Fig. 11. As will be seen, this plate is provided with a depressed socket 43, adapted to receive the flange 44 of the bolt 10, the flange in this case being circular. The socket portion of the felly plate is set into the side of the felly, the latter being suitably recessed for the purpose. The latch 45 in this construction is not provided with a socket, but the lower face 46 of the locking projection 47 engages the upper flat face 30 of the felly plate which prevents the rotation of the latch when it is in engagement with the locking ring. This arrangement permits the bolt to be made shorter than in the forms of my invention illustrated in the preceding figures by an amount equal to the thickness of the bolt flange and permits the outer face of the head 22 of the nut or sleeve 17 to be brought in closer to the side of the felly by an equal amount. This is of importance in a structure of this kind as the locking means should be made to project as little as possible. I have succeeded with my present structure in bringing the locking means within the plane of the outer edge of the tire-carrying rim, thereby effectually protecting the locking means against injury from contact with curbs or similar obstructions.

Figs. 12, 14 and 16 illustrate a modification of my invention in which in place of the locking ring such as shown in Figs. 7 and 10, a series of locking wedges 50 are used; these wedges being carried by or forming a part of locking nuts or latches 51 corresponding to the latches 18 heretofore described. These latches or locking nuts screw upon sleeves 17 which, in turn, are threaded upon the projecting ends of bolts 10. The felly is preferably recessed as indicated at 52 in order to reduce the lateral projection of the locking device, a somewhat greater latitude of movement for the locking nut or wedge-carrying member being necessary with this construction than with the plane faced locking member or latch 18 previously described. One corner of the wedge 50 is preferably rounded off as shown at 53 in Figs. 12 and 16 in order to permit the wedge to clear the under-surface of the tire-carrying rim when the wedge is revolved. The back of the wedge may also, when used with certain types of tire-carrying rims, be recessed as indicated at 54, in order to permit the wedge to be drawn back sufficiently to clear the face of the felly. The operation of this modification is, in the main, identical with that of the structures already described; the rotation of the sleeve 17 in one direction causing the wedge to be drawn out until its edge is beyond the plane of the felly, when it will be revolved to the position shown by dotted lines in Fig. 14, leaving the tire-carrying rim free to be removed. The rotation of the sleeve 17 in the opposite direction will cause the wedge to be returned to upright position, further rotation of the sleeve forcing the wedge into position between the tire-carrying rim and felly band.

In Figs. 13 and 15 I have shown my invention as applied with an ordinary one-piece clencher rim. In this modification the felly band 60 is provided at one edge with an upwardly and outwardly projecting flange or support 61, upon which rests one side of the clencher rim 62. The other side of the clencher rim is supported by means of a plurality of wedges 63 carried by wedge carriers or locking nuts 64 threaded upon sleeves 17. The operation of this form of my invention is identical with that of the form shown in Figs. 12, 14 and 16.

I have shown in the drawings and particularly described in the specification certain preferred embodiments of my invention, but these embodiments are to be regarded as illustrative only, and I do not intend to limit myself to the details thereof. It is obvious that my invention is capable of many modifications, all of which, so long as they fall within the scope of my invention, I intend that the following claims shall embrace.

Having thus described my invention, I claim:

1. In a vehicle wheel, in combination, a felly, a tire-carrying rim, means for preventing lateral movement of the rim with reference to the felly in one direction, and means for preventing the lateral removal of said tire-carrying rim from said felly in the opposite direction comprising a member rotatably supported from the felly, and a latch rotatably mounted on said member, the rotation of said member in one direction acting first to rotate said latch through a part of a revolution and then to move said latch laterally with reference to said felly without further rotating the latch.

2. In a vehicle wheel, in combination, a felly, a tire-carrying rim, means for preventing lateral movement of the rim with reference to the felly in one direction, and means for preventing the lateral removal of said tire-carrying rim from said felly in the opposite direction comprising a member rotatably supported from the felly, said member being externally threaded, and a latch screwing on the externally threaded portion of said member, the rotation of said member in one direction acting first to rotate said latch through a part of a revolution and then to move said latch laterally with reference to said felly without further rotating the latch.

3. In a vehicle wheel, in combination, a felly, a tire-carrying rim, means for preventing lateral movement of the rim with reference to the felly in one direction, and means for preventing the lateral removal of said tire-carrying rim from said felly in the opposite direction comprising a rotatable member having a screw-threaded engagement with means carried by the felly, and a latch rotatably mounted on said member, the rotation of said member in one direction acting first to rotate said latch through a part of a revolution and then to move said latch laterally with reference to said felly without further rotating the latch.

4. In a vehicle wheel in combination, a felly, a tire-carrying rim, means for preventing lateral movement of the rim with reference to the felly in one direction, and means for preventing the lateral removal of said tire-carrying rim from said felly in the opposite direction comprising a screw-threaded member projecting laterally from said felly, a sleeve screwing on said threaded member, an eccentric latch rotatably mounted on said sleeve, the rotation of said sleeve acting to rotate said latch into operative position, and a stop for preventing the further rotation of said latch when moved to operative position by the rotation of said sleeve.

5. In a vehicle wheel, in combination, a felly, a tire-carrying rim, means for preventing the removal of said rim including a rotatable member having a screw-threaded engagement with means carried by the rim, an eccentric latch rotatably mounted on said member and means for limiting the rotary movement of said latch comprising a stop projecting from the side of said felly, one part of said latch engaging said stop when the latch is rotated to operative position, and another part of said latch engaging said stop when the latch is rotated to inoperative position.

6. In a vehicle wheel, in combination, a felly, a tire-carrying rim, means for preventing the lateral movement of the rim with reference to the felly in one direction, and means for preventing the lateral removal of said tire-carrying rim from said felly in the opposite direction comprising a screw-threaded member projecting laterally from said felly, a sleeve screwing on said threaded member, an eccentric latch rotatably mounted upon said sleeve, and a stop for preventing the rotation of said latch beyond its inoperative position when it is moved to inoperative position.

7. In a vehicle wheel, in combination, a felly, a tire-carrying rim, means for preventing lateral movement of the rim with reference to the felly in one direction, and means for preventing the lateral removal of said tire-carrying rim from said felly in the opposite direction comprising a screw-threaded member projecting laterally from said felly, a sleeve screwing on said threaded member, an eccentric latch rotatably mounted upon said sleeve, means for preventing the rotation of said latch when the same is moved to operative position, and a stop for preventing the rotation of said latch beyond its inoperative position when it is moved to inoperative position.

8. In a vehicle wheel, in combination, a felly, a tire-carrying rim, means for preventing lateral movement of the rim with reference to the felly in one direction, and means for preventing the lateral removal of said tire-carrying rim from said felly in the opposite direction comprising a screw-threaded member projecting laterally from said felly, a sleeve screwing on said threaded member, an eccentric latch rotatably mounted upon said sleeve, means for preventing the rotation of said latch beyond its inoperative position, and means for temporarily retaining said latch in inoperative position.

9. In a vehicle wheel, in combination, a felly, a tire-carrying rim, means for preventing lateral movement of the rim with reference to the felly in one direction, and means for preventing the lateral removal of said tire-carrying rim from said felly in the opposite direction comprising a screw-threaded member projecting laterally from said felly, a sleeve screwing on said threaded member, an eccentric latch rotatably mounted upon said sleeve, means for preventing the rotation of said latch when moved to operative position, means for preventing the rotation of said latch beyond its inoperative position when moved to inoperative position, and means for temporarily retaining said latch in inoperative position.

10. In a vehicle wheel, in combination, a felly, a tire-carrying rim, means for preventing lateral movement of the rim with reference to the felly in one direction, and means for preventing the lateral removal of said tire-carrying rim from said felly in the opposite direction comprising a screw-threaded member projecting laterally from said felly, a sleeve screwing on said threaded member, an eccentric latch rotatably mounted upon said sleeve, means on the felly engaged by said latch for preventing rotation of the latter when moved to operative position, and means for guiding said latch into engagement with said rotation-preventing means.

11. In a vehicle wheel, in combination, a felly, a tire-carrying rim, means for preventing lateral movement of the rim with reference to the felly in one direction, and means for preventing the lateral movement of said tire-carrying rim from said felly in the opposite direction comprising a screw-threaded member projecting laterally from said felly, a sleeve screwing on said threaded member, said sleeve being externally threaded, and a rotatable eccentric latch screwing on said sleeve.

12. In a vehicle wheel, in combination, a felly, a tire-carrying rim, means for preventing lateral movement of the rim with reference to the felly in one direction, and means for preventing the lateral removal of said tire-carrying rim from said felly in the opposite direction comprising a screw-threaded member projecting laterally from said felly, a sleeve screwing on said threaded member, said sleeve being provided with an external screw-thread of an opposite pitch from that of the member projecting from the felly, and a rotatable eccentric latch screwing on said sleeve.

13. In a vehicle wheel, in combination, a felly, a tire-carrying rim, means for preventing lateral movement of the rim with reference to the felly in one direction, and means for preventing lateral movement of the rim upon the felly in the opposite direction comprising a bolt passing transversely through the felly having a non-circular collar at one side of the felly and a screw-threaded end projecting beyond said collar, a sleeve screwing on said threaded end, and an eccentric latch screwing on said sleeve, said latch having a socket of the same outline as the collar adapted to receive said collar when the latch is moved to operative position.

14. In a vehicle wheel, in combination, a felly, a tire-carrying rim, means for preventing lateral movement of the rim with reference to the felly in one direction, and means for preventing the lateral movement of the rim upon the felly in the opposite direction comprising a plate secured to the side of the felly, and having a hole therethrough of non-circular outline, a bolt passing transversely through said felly and through the hole in said plate, and having a portion of a cross-section fitting said hole, a collar on said bolt bearing against said plate, said bolt having a screw-threaded portion projecting from said collar, a sleeve screwing on said projecting portion, and a latch mounted upon said sleeve.

15. In a vehicle wheel, in combination, a felly, a tire-carrying rim, means for preventing lateral movement of the rim with reference to the felly in one direction, and means for preventing the lateral movement of the rim upon the felly in the opposite direction comprising a plate secured to the side of the felly, and having a hole therethrough of non-circular outline, a bolt passing transversely through said felly and through the hole in said plate, and having a portion of a cross-section fitting said hole, and a collar of non-circular outline bearing against said plate, said bolt having a screw-threaded portion projecting beyond said collar, a sleeve screwing on said projecting portion, and an eccentric latch rotatably mounted on said sleeve engaging said collar when moved to operative position and locked against rotation thereby.

16. In a vehicle wheel, in combination, a tire-carrying rim, means for preventing lateral movement of the rim with reference to the felly in one direction, and means for preventing the lateral movement of the rim upon the felly in the opposite direction comprising a plate secured to the side of the felly, a bolt passing transversely through the felly and through a hole in said plate, and having a collar engaging said plate, and a screw-threaded portion projecting beyond said collar, a sleeve screwing on said projecting portion, an eccentric latch rotatably mounted upon said sleeve, and a lug projecting outwardly from said plate engaging said latch.

17. In a vehicle wheel, in combination, a felly, a tire-carrying rim, means for preventing lateral movement of the rim with reference to the felly in one direction, and means for preventing the lateral movement of the rim upon the felly in the opposite direction comprising a plate secured to the side of the felly, a bolt passing transversely through the felly and through a hole in said plate, and having a collar engaging said plate, and a screw-threaded portion projecting beyond said collar, a sleeve screwing on said projecting portion, an eccentric latch rotatably mounted upon said sleeve, and means for limiting the rotation of said latch in both directions comprising a lug projecting from said plate and engaging said latch.

18. In a vehicle wheel, in combination, a felly, a tire-carrying rim, and means for preventing the removal of said rim including a bolt passing transversely through the felly and having a screw-threaded portion projecting laterally from the side of the felly, a plate secured to the side of the felly adjacent to said screw-threaded portion, said plate having a lug bent up therefrom, a nut screwing on said threaded portion and an eccentric latch rotatably mounted on said nut, said latch when rotated to inoperative position engaging said lug and being thereby held against further rotation.

19. In a vehicle wheel, in combination, a felly, a tire-carrying rim, means for preventing the removal of said rim including a rotatable latch attached to said felly, and means for limiting the rotation of said latch comprising a plate secured to the felly and having an outwardly bent lug adapted to be engaged by said latch.

20. In a vehicle wheel, in combination, a felly, a rim, a freely rotatable member carried by one of said parts, a latch for preventing the removal of said rim from said felly rotatably mounted on said member, and a stop mounted adjacent to said latch, said stop being engaged by the latch and limiting its movement when its latch is rotated through a part of a revolution by the rotation of said member.

21. In a vehicle wheel, a felly, a tire-carrying rim, means for preventing lateral movement of the rim with reference to the felly in one direction, and means for preventing the lateral movement of the rim upon the felly in the opposite direction comprising a plate secured to the side of the felly, a bolt passing transversely through the felly and through a hole in said plate, and having a collar engaging said plate, and a screw-threaded portion projecting beyond said collar, a sleeve screwing on said projecting portion, an eccentric latch rotatably mounted upon said sleeve, said latch having a lug with an inclined face projecting laterally therefrom, and a lug projecting from said plate adapted to be engaged by the lug on said latch when the latch is moved to inoperative position.

22. In a vehicle wheel, a felly, a tire-carrying rim, means for preventing lateral movement of the rim with reference to the felly in one direction, and means for preventing the lateral movement of the rim upon the felly in the opposite direction comprising a plate secured to the side of the felly, a bolt passing transversely through the felly and through a hole in said plate, and having a collar engaging said plate, and a screw-threaded portion projecting beyond said collar, a sleeve screwing on said projecting portion, an eccentric latch rotatably mounted upon said sleeve, said latch having a lug with an inclined face projecting laterally therefrom, and a lug projecting from said plate adapted to be engaged by the lug on said latch when the latch is moved to inoperative position, another portion of said latch engaging said lug on said plate when said latch is moved to operative position.

23. In a vehicle wheel, a felly, a tire-carrying rim, means for limiting the lateral movement of the rim on the felly in one direction, and means for locking the rim against lateral removal from the felly in the opposite direction comprising a threaded member projecting laterally from the felly, an externally threaded sleeve screwing on said threaded member, the pitches of the threads on said member and sleeve, respectively, being opposite, and a rim-locking member screwing on said sleeve, said sleeve screwing into engagement with a part fixed with relation to said felly when said locking member is moved to operative position, whereby said sleeve acts as a jam nut.

24. In a vehicle wheel, a felly, a tire-carrying rim, means for limiting the lateral movement of the rim on the felly in one direction, and means for locking the rim against lateral removal from the felly in the opposite direction comprising a threaded member projecting laterally from the felly, an externally threaded sleeve screwing on said threaded member, the pitches of the threads on said member and sleeve, respectively, being opposite, and a rim-locking member screwing on said sleeve, said sleeve having a head on its outer end of greater diameter than the diameter of the externally threaded portion thereof, said head adapted to be engaged by said locking member when the latter is moved to inoperative position.

25. In a vehicle wheel, a felly, a tire-carrying rim, means for limiting the lateral movement of the rim on the felly in one direction, and means for locking the rim against lateral removal from the felly in the opposite direction comprising a threaded member projecting laterally from the felly, an externally threaded sleeve screwing on said threaded member, the pitches of the threads on said member and sleeve, respectively, being opposite, and a rim-locking member screwing on said sleeve, said sleeve having a head on its outer end of greater diameter than the diameter of the externally threaded portion thereof, said head adapted to be engaged by said locking member when the same is moved to inoperative position, and means for preventing the complete rotation of said locking member.

26. In a vehicle wheel, in combination, a felly, a tire-carrying rim, a bolt passing transversely through the felly having a collar near one end thereof engaging the side of the felly, a nut screwing on the opposite end of the bolt, said bolt being clamped in fixed position in said felly by said collar and nut, a portion of said bolt projecting laterally beyond said collar, and a keeper movably mounted on said projecting portion for securing said rim to said wheel.

27. In a vehicle wheel, in combination, a felly, a tire-carrying rim, means for preventing lateral movement of the rim with reference to the felly in one direction, a bolt passing transversely through the felly and having a collar near one end thereof engaging the side of the felly, a portion of said bolt projecting laterally beyond said collar, and a member rotatably mounted upon said projecting portion for preventing the lateral removal of the rim from the felly.

28. In a vehicle wheel, in combination, a felly, a tire-carrying rim, means for preventing lateral movement of the rim with reference to the felly in one direction, a plate fixed to the side of the felly having a hole therethrough of non-circular outline, a bolt passing transversely through said felly and through the hole in said plate, and having a portion of a cross-section fitting said hole and a collar bearing against said plate, said bolt having a screw-threaded portion projecting beyond said collar, and means carried by said screw-threaded portion for preventing the lateral removal of the rim from the felly.

29. In a vehicle wheel, in combination, a felly, a tire-carrying rim, means for limiting lateral movement of said rim with reference to said felly in one direction, a rib having an inclined bearing face, projecting inwardly from said rim, a transversely split annular locking ring of wedge-shaped cross-section inserted between said felly and rim and engaging the inclined bearing face of said rib, the said locking ring having an outwardly turned flange projecting from the inner edge thereof, said flange engaging the inner side of said rib, and retaining devices engaging said locking ring for preventing the lateral removal of said rim.

30. In a vehicle wheel, in combination, a felly, a tire-carrying rim, means for limiting lateral movement of said rim with reference to said felly in one direction, opposed bearing surfaces on said felly and rim, a split annular locking ring engaging said bearing surfaces, means for forcing said locking ring into engagement with said bearing surfaces when the rim is mounted upon the felly, and means for preventing the separation of said locking ring and rim when the latter is removed from the felly, said means permitting of limited relative movement between said locking ring and the bearing surface on the rim.

JAMES H. WAGENHORST.

Witnesses:
E. C. BARD,
G. W. RINK.